United States Patent [19]

Sekiya et al.

[11] Patent Number: 4,613,633
[45] Date of Patent: Sep. 23, 1986

[54] COPOLYMER LATEX

[75] Inventors: Masayoshi Sekiya, Tokyo; Koichi Harada, Yokohama, both of Japan

[73] Assignee: Nippon Zeon Co., Ltd., Tokyo, Japan

[21] Appl. No.: 705,639

[22] Filed: Feb. 26, 1985

[51] Int. Cl.$^4$ .......................................... C08F 276/06
[52] U.S. Cl. ................................... 523/201; 524/460; 427/391; 428/421
[58] Field of Search ....................... 523/201; 524/460; 427/391; 428/421

[56] References Cited

U.S. PATENT DOCUMENTS

| | | | |
|---|---|---|---|
| 3,282,876 | 11/1966 | Williams et al. | 523/201 |
| 3,657,172 | 4/1972 | Gallagher et al. | 523/201 |
| 3,985,703 | 10/1976 | Ferry et al. | 523/201 |
| 4,134,872 | 1/1979 | Lee | 524/460 |
| 4,265,977 | 5/1981 | Kawamura et al. | 523/201 |
| 4,413,068 | 11/1983 | Sinclair et al. | 525/902 |
| 4,497,917 | 2/1985 | Upson et al. | 523/201 |

OTHER PUBLICATIONS

Polymer Handbook, Brandrup et al, pp. VIII-1 to VIII-7.

Primary Examiner—Joseph L. Schofer
Assistant Examiner—N. Sarofim
Attorney, Agent, or Firm—Sherman & Shalloway

[57] ABSTRACT

A copolymer latex comprising heterogeneous polymer particles having a hard polymer domain and a soft polymer domain, characterized in that (a) the hard polymer domain is a polymer having a glass transition temperature of at least 60° C.,
(b) the soft polymer domain is a copolymer obtained by polymerizing in the presence of a latex of the hard polymer a monomeric composition composed of
  (i) 20 to 70% by weight of an aliphatic conjugated diene monomer,
  (ii) 20 to 60% by weight of a monovinylidene aromatic monomer,
  (iii) 0.5 to 10% by weight of an ethylenically unsaturated acid,
  (iv) 0 to 10% by weight of an ethylenically unsaturated amide, and
  (v) 0 to 30% by weight of a monomer copolymerizable with said monomers,
(c) the proportion of the hard polymer domain is 55 to 90% by weight of the entire polymer particles, and
(d) the proportion of the soft polymer domain is 45 to 10% by weight of the entire polymer particles.

10 Claims, No Drawings

COPOLYMER LATEX

This invention relates to a copolymer latex comprising heterogeneous polymer particles which is particularly suitable for paper coating, and to a paper coating composition comprising this latex which gives coated paper having improved adaptability to blister packaging and printing.

Coating of an aqueous pigment composition on paper and paperboards improves optical properties such as gloss and whiteness and also provide improved surface smoothness and ink receptivity which lead to increased adaptability to printing.

The utility of coated paper is not limited merely to printing, but has been extended, for example, to a blister packaging application in which a plastic cover for including an article is heat-sealed onto the coated surface of the paper. In particular, coated paperboards are now required to have not only printing adaptability but also blister packaging adaptability an bondability as after-processing properties. Carboxylated styrene/butadiene copolymer latices heretofore used as binders for paper coating compositions cannot fully meet the above requirements and are desired to be improved.

With this background in mind, the present inventors strived to develop a paper coating composition having improved blister packaging adaptability and bondability as well as improved printing adaptability, and have now found that these properties can be improved by using a polymer latex comprising certain heterogeneous polymer particles.

Thus, the present invention provides a copolymer latex comprising heterogeneous polymer particles having a hard polymer domain and a soft polymer domain, characterized in that (a) the hard polymer domain is a polymer having a glass transition temperature of at least 60° C.,
(b) the soft polymer domain is a copolymer obtained by polymerizing in the presence of a latex of the hard polymer a monomeric composition composed of
  (i) 20 to 70% by weight of an aliphatic conjugated diene monomer,
  (ii) 20 to 60% by weight of a monovinylidene aromatic monomer,
  (iii) 0.5 to 10% by weight of an ethylenically unsaturated acid,
  (iv) 0 to 10% by weight of an ethylenically unsaturated amide, and
  (v) 0 to 30% by weight of a monomer copolymerizable with said monomers,
(c) the proportion of the hard polymer domain is 55 to 90% by weight of the entire polymer particles, and
(d) the proportion of the soft polymer domain is 45 to 10% by weight of the entire polymer particles.

The invention also provides a paper coating composition comprising the aforesaid copolymer latex and a pigment or a binder or both.

Latices similar to the copolymer latex of this invention composed of heterogeneous polymer particles are known from U.S. Pat. Nos. 4,134,872 and 4,413,068.

U.S. Pat. No. 4,134,872 issued on Jan. 16, 1979 and assigned to Dow Chemical Co. discloses an aqueous latex of heterogeneous polymer particles. In the Dow latex, the dispersed polymer particles are heterogeneous and individually comprise, per 100 parts by weight of the polymer particles, (1) from about 50 to about 90 parts by weight of a soft interpolymer domain having a glass transition temperature equal to or less than about 25° C. and comprising, based upon the total soft interpolymer,
  (a) from about 30 to about 69 weight percent of a monovinylidene aromatic monomer,
  (b) from about 30 to about 60 weight percent of an open-chain aliphatic conjugated diene having from 4 to about 9 carbon atoms, and
  (c) from about 1 to about 10 weight percent of a monoethylenically unsaturated carboxylic acid; and
(2) from about 10 to about 50 parts by weight of a hard resinous polymer domain having a glass transition temperature of at least about 85° C.

The latex is prepared by emulsion polymerizing the monomers of the soft interpolymer domain in an aqueous medium comprising dispersed particles of the hard resinous polymer.

The latex of this invention is characterized by the fact that the proportion of the hard domain constituting the heterogeneous polymer particles is 55 to 90% by weight based on the entire particles. Hence, it can be clearly distinguished from the Dow latex in which the proportion of the hard domain is 10 to 50% by weight.

U.S. Pat. No. 4,413,068 issued on Nov. 1, 1983 and assigned to Polysar International S. A. discloses a latex comprising about 40 to 60 weight percent of heterogeneous polymer particles which have:

(1) an initial domain comprising about 50% by volume of the particle which is a polymer of a monomer composition comprising:
  (a) from about 55 to about 65 parts by weight of a monovinylidene aromatic monomer;
  (b) from about 45 to about 35 parts by weight of an aliphatic $C_{4-6}$ conjugated diene monomer; and per 100 parts by weight of the total of said monovinylidene aromatic monomer and said aliphatic $C_{4-6}$ conjugated diene monomer;
  (c) from about 0.5 to 5 parts by weight of $C_{3-5}$ ethylenically unsaturated carboxylic acid; and
  (d) from about 0.5 to 5 parts by weight of a $C_{3-6}$ ethylenically unsaturated primary amide; and
(2) a subsequent domain comprising about 50% by volume of the particle which is a polymer of a monomer composition comprising:
  (a) from about 75 to about 85 parts by weight of a monovinylidene aromatic monomer;
  (b) from about 25 to 15 parts by weight of an aliphatic $C_{4-6}$ conjugated diene monomer and per 100 parts by weight of the total of said monovinylidene aromatic monomer and said aliphatic $C_{4-6}$ conjugated diene monomer;
  (c) from about 0.5 to 5 parts by weight of a $C_{3-5}$ ethylenically unsaturated carboxylic acid and;
  (d) from about 0.5 to 5 parts by weight of a $C_{3-6}$ ethylenically unsaturated primary amide.

This latex has a relatively soft polymer as an initial domain and a relatively hard polymer as a subsequent domain, and the polymer compositions of the domains in this latex are contrary to those of the copolymer latex of this invention. This is a feature which clearly distinguishes the latex of the invention from the prior art latex.

The polymer particles constituting the latex of this invention are heterogeneous polymer particles composed of an essentially non-film forming "hard" polymer domain and an essentially film-forming "soft" polymer domain.

The copolymer latex of this invention is film-forming. The term "film-forming", as used herein, denotes the property of the copolymer latex to form a continuous film under temperature conditions employed in drying the coating composition coated on a support such as a paperboard, specifically at temperatures of not more than 100° C., preferably not more than 60° C. The term "essentially non-film forming", as used herein, means that a latex of each of the polymers constituting the above domains is not film-forming under the aforesaid conditions.

It is essential that the copolymer latex of this invention be film-forming. Since the copolymer latex of this invention also functions as a pigment or binder by itself when used for paper coating, it has the advantage that no other pigment or binder needs to be used, or the amount of such a pigment or binder can be small. When the latex does not form a film in a drying step after coating, the required adhesion strength cannot be obtained and such a copolymer latex does not meet the objective of this invention. It is also essential that the latex polymer particles be heterogeneous polymer particles. The use of polymer particles of a single layer structure having a uniform particle composition, which have the same proportions of the monomers constituting the polymer but do not form heterogeneous polymer particles, does not lead to improved blister packaging adaptability and high gloss intended by the present invention.

The heterogeneous polymer particles denote polymer particles composed of a hard polymer domain and a soft polymer domain, for example, polymer particles of a structure in which a core of a hard polymer is enclosed by a continuous or discontinuous shell of a soft polymer, or polymer particles of a structure in which a hard polymer domain and a soft polymer domain contact each other at their boundary surface exclusively and hemispherically. In the following description, the hard polymer domain is referred to as a core, and the soft polymer domain, as a shell, for the sake of convenience.

The polymer constituting the core of the copolymer latex of this invention is a "hard" polymer which does not form a film by itself at a temperature of not more than 60° C. and has an average particle diameter of, preferably 0.1 to 0.45 micron. If the particle diameter is less than 0.1 micron and the glass transition temperature is less than 60° C., the desired high blister packaging adaptability and high gloss cannot be obtained. If the particle diameter exceeds 0.45 micron, the production of the latex is difficult. The particles constituting the core are produced by a known emulsion polymerization technique.

Monomers used for the production of the hard polymer constituting the core include, for example monovinylidene aromatic monomers such as styrene, alpha-methylstyrene, 2-methylstyrene, 3-methylstyrene, 4-methylstyrene, 2,4-diisopropylstyrene, 2,4-dimethylstyrene, 4-t-butylstyrene, 5-t-butyl-2-methylstyrene, monochlorostyrene, dichlorostyrene, monofluorostyrene and hydroxymethylstyrene; methacrylic or chloroacrylic acid esters such as methyl methacrylate, ethyl methacrylate, isopropyl methacrylate, phenyl methacrylate, cyclohexyl methacrylate, 2-chloroethyl methacrylate, methyl chloroacrylate, ethyl chloroacrylate and butyl chloroacrylate; ethylenic nitrile compounds such as acrylonitrile and methacrylonitrile; vinyl chloride; and unsaturated carboxylic acids, or esters or sodium or ammonium salts thereof, such as acrylic acid, methacrylic acid, crotonic acid, cinnamic acid, itaconic acid, fumaric acid, maleic acid, butenetricarboxylic acid, and monobutyl itaconate. These monomers may be used singly or in combination. Polymers yielding film-forming polymers, for example, aliphatic conjugated diene monomers such as 1,3-butadiene, 2-methyl-1,3-butadiene and 2-chloro-1,3-butadiene, and acrylic acid esters such as methyl acrylate, ethyl acrylate, butyl acrylate and 2-ethylhexyl acrylate, can also be used if copolymerization thereof with the aforesaid monomers gives copolymers which do not form a film at temperatures of not more than 60° C. If further required, hydrophilic monomers such as beta-hydroxyethyl acrylate, beta-hydroxypropyl acrylate, beta-hydroxyethyl methacrylate, acrylamide, methacrylamide, N-methylolacrylamide, N-butoxymethyl acrylamide, glycidyl acrylate, glycidyl methacrylate, acrolein and allyl alcohol, may be used in combination with the aforesaid monomers.

Examples of aliphatic conjugated diene monomer (i) for forming the shells of the latex particles by polymerization in the presence of the polymer latex forming the core include 1,3-butadiene, 2-methyl-1,3-butadiene, 2,3-dimethyl-1,3-butadiene, and halogen-substituted butadiene. The amount of the aliphatic conjugated diene monomer in the entire monomeric mixture used to form the shell is 20 to 70% by weight. If it is less than 20% by weight, the resulting copolymer latex has no film forming ability, and has inferior surface strength and blister packaging adaptability. If it exceeds 70% by weight, the copolymer latex has poor water resistance. The preferred amount of the (i) is 25 to 65% by weight.

Examples of the monovinylidene aromatic monomer (ii) are styrene, alpha-methylstyrene, 4-methylstyrene, monochlorostyrene and hydroxymethylstyrene. The amount of this monomer in the entire monomeric mixture is 20 to 60% by weight. If it is less than 20% by weight, the gloss of paper coated with the resulting copolymer latex is inferior. If it exceeds 60% by weight, an improvement in blister packaging adaptability cannot be expected. The preferred amount of the monomer (ii) 25 to 50% by weight.

Examples of the ethylenically unsaturated acid (iii) include unsaturated carboxylic acids such as acrylic acid, methacrylic acid, crotonic acid, cinnamic acid, itaconic acid, fumaric acid, maleic acid and maleic anhydride; monoesters of unsaturated dicarboxylic acids such as monoethyl itaconate, monobutyl fumarate, monoethyl maleate and butylhydroxypropyl maleate; and unsaturated sulfonic acids such as 2-sulfoethyl acrylate, 2-sulfopropyl methacrylate, acrylamidopropanesulfonic acid and styrenesulfonic acid. These acids may also be used in the form of salts with alkali metals or ammonia. These monomers may be used singly or in combination. The amount of the ethylenically unsaturated acid (iii) is 0.5 to 10% by weight. If it is less than 0.5% by weight, the copolymer latex has inferior mechanical stability and pigment mixing stability. If it exceeds 10% by weight, the resulting copolymer latex has an increased viscosity and does not serve for practical purposes. The preferred amount of the monomer (iii) is 0.8 to 8% by weight.

Examples of the ethylenically unsaturated amide (iv) are acrylamide, methacrylamide, N-methylolacrylamide and N-butoxymethylacrylamide. The amount of the monomer (iv) is 0 to 10% by weight. This monomer serves to increase the mechanical stability and pigment mixing stability of the polymer latex. No increase in effect can be expected even if its amount exceeds 10% by weight. The preferred amount of the monomer (iv) is 2 to 7% by weight.

Examples of the other monomer (v) copolymerizable with the above monomers are alkyl esters of acrylic acid and methacrylic acid such as methyl acrylate, ethyl acrylate, methyl methacrylate and butyl acrylate, ethylenically unsaturated nitrile compounds such as acrylonitrile and methacrylonitrile, beta-hydroxyethyl acrylate, glycidyl acrylate, glycidyl methacrylate, acrolein, allyl alcohol, divinylbenzene, diallyl phthalate, diallyl maleate, triallyl cyanurate, ethylene glycol dimethacrylate, allyl acrylate and p-isopoepenylstyrene. The amount of the copolymerizable monomer (v) is 0 to 30% based on the entire monomeric mixture.

The proportions of the core portion and shell portion constituting the latex particles of this invention are 55 to 90% by weight, and 45 to 10% by weight, respectively. If the proportion of the core portion is less than 55% by weight, no improvement is achieved in printing adaptability and blister packaging adaptability. If it exceeds 90% by weight, the adhesion strength, blister packaging adaptability and bondability are reduced. The preferred proportion of the core portion is 55 to 80% by weight, especially 55 to 70% by weight.

The copolymer latex of this invention composed of heterogeneous polymer particles is produced by a known seed polymerization technique. Specifically, the monomers forming the shell are emulsion-polymerized in the presence of the polymer particles constituting the core. In order for the shell-forming polymer not to form particles independently of particles of the core but to form heterogeneous polymer particles, the polymerization should be carried out under such conditions that micelles of the emulsifier are not present in the aqueous phase.

The step of forming particles of the core and the step of forming the shell may be performed separately. Or polymerization for the formation of the shell may be performed after the formation of the core. Preferably, the resulting latex particles have an average particle diameter of 0.1 to 0.5 micron in order to achieve the object of this invention.

The latex of this invention comprising the heterogeneous polymer particles is used in a paper coating composition as a binder or pigment, or if required, in combination with another binder or pigment.

Examples of the other pigment that can be used in this invention are mineral pigments such as clays, calcium carbonate, aluminum hydroxide, titanium white, barium sulfate, satin white and talc, and organic pigments such as polystyrene and phenolic resins. Of these, clays, especially kaolinite clay, are preferred. Examples of the other binder that can be used in this invention include water-soluble polymers such as starch, casein, polyvinyl alcohol, methyl cellulose, carboxymethyl cellulose and sodium alginate, and sythetic latices such as styrene/butadiene copolymer latex, methyl methacrylate/butadiene copolymer latex, polyvinyl acetate latex and acrylate ester copolymer latices.

The copolymer latex of this invention may be used in an amount of 3 to 40% by weight as solids based on the total amount (as solids) of the polymer latex, pigment and binder.

As required, the composition of this invention may further include a pigment dispersant, a viscosity regulating agent, a water holding agent, a water-proofing agent, a dye, a fluorescent dye, a lubricant, a pH adjusting agent, an antifoamer, a surface-active agent and an antiseptic in addition to water, the pigment, the binder and the polymer latex.

The use of the copolymer latex of this invention having the heterogeneous structure can give coated paper, particularly coated paperboards, having much improved blister packaging adaptability and printing adaptability over that obtained by using a conventional paper-coating copolymer latex. Since the copolymer latex of this invention has the function of a pigment and a binder, the amount of the binders used can be decreased, and to economic advantage, the expensive casein formulation can be superseded by a low-cost starch formulation.

The paper coating composition in accordance with this invention can be widely used in the production of various printing papers and various paperboards since it gives coated paper having excellent blister packaging adaptability and bondability as processing properties in addition to excellent printing adaptability. It is especialy suitable for producing various paperboards.

The following examples illustrate the present invention more specifically. It should be understood, however, that the invention is in no way limited to these examples alone. All parts and percentages in these examples are by weight.

EXAMPLE 1

Synthetic copolymer latices comprising heterogeneous polymer particles having the core and shell compositions shown in Table 1 were produced by using a known seed polymerization technique. Furthermore, an ordinary synthetic copolymer latex (j) having a uniform particle structure was produced by single-stage polymerization.

The glass transition temperatures of the core portions were the temperature at which their loss modulus (E″) measured by a viscoelasticity measuring method (at a frequency of 100 Hz and a temperature elevating rate of 2° C./min.) showed a maximum.

TABLE 1

| | | Latex No. Invention | | | | | | | | | |
|---|---|---|---|---|---|---|---|---|---|---|---|
| | Monomer | 1 | 2 | 3 | 4 | 5 | 6 | 7 | 8 | 9 | 10 |
| Core composition | Butadiene | | | 7 | | | | 10 | | 10 | 13 |
| | Styrene | 54 | 53 | 46 | 27.5 | 30 | 30 | 48 | 35 | 58 | 47 |
| | Methyl methacrylate | | | | 27.5 | | 17 | | 25 | | 23 |
| | Acrylonitrile | | | | | 23 | 12 | | 10 | | |
| | Itaconic acid | 1 | | 2 | | | | 2 | | | 2 |
| | Methacrylic acid | | | | | 2 | | | | 2 | |
| | Acrylic acid | | | | | | 1 | | | | |
| | Acrylamide | | 2 | | | | | | | | |
| | Glass transition point (°C.) | 100 | 100 | 75 | 90 | 107 | 96 | 69 | 98 | 74 | 77 |
| | Average particle diameter (μ) | 0.28 | 0.25 | 0.20 | 0.32 | 0.30 | 0.27 | 0.21 | 0.30 | 0.24 | 0.35 |
| Shell | Butadiene | 18 | 25 | 20 | 20 | 18 | 25 | 20 | 18 | 13 | 6.5 |

TABLE 1-continued

| composition | Styrene | 25 | 18 | 14 | 22.5 | 18 | 13.5 | 13.5 | 11.5 | 11.5 | 8 |
|---|---|---|---|---|---|---|---|---|---|---|---|
| | Methyl methacrylate | | | 10 | | | | 5 | | 5 | |
| | Acrylonitrile | | | | | 7 | | | | | |
| | Itaconic acid | | 1 | | 0.5 | 1 | | | | | |
| | Methacrylic acid | 1 | 1 | | | 1 | | 1.5 | 0.5 | | 0.5 |
| | Acrylic acid | | | 1 | | | 1.5 | | | 0.5 | |
| | Acrylamide | 1 | | | 2 | | | | | | |
| | Core/shell ratio | 55/45 | 55/45 | 55/45 | 55/45 | 55/45 | 60/40 | 60/40 | 70/30 | 70/30 | 85/15 |

| | | Latex No. Comparison | | | | | | | | | |
|---|---|---|---|---|---|---|---|---|---|---|
| | Monomer | a | b | c | d | e | f | g | h | i | j |
| Core | Butadiene | | | 14 | 21 | | | | | 7 | 18 |
| composition | Styrene | 20 | 29 | 39 | 31 | 35 | 21 | 35 | 50 | 46 | 79 |
| | Methyl methacrylate | 19.2 | | | | 13 | 15 | 13 | 19 | | |
| | Acrylonitrile | | | | | | 13 | | 24 | | |
| | Itaconic acid | 0.8 | | 2 | 1.5 | | 1 | 2 | 1 | 2 | 1 |
| | Methacrylic acid | | | | | 2 | | | 1 | | 1 |
| | Acrylic acid | | 1 | | | | | | | | |
| | Acrylamide | | | | 1.5 | | | | | | 1 |
| | Glass transition point (°C.) | 98 | 99 | 52 | 34 | 95 | 97 | 95 | 100 | 75 | |
| | Average particle diameter (μ) | 0.25 | 0.30 | 0.25 | 0.25 | 0.30 | 0.27 | 0.30 | 0.30 | 0.08 | |
| Shell | Butadiene | 25 | 25 | 20 | 8 | 24.5 | 34.5 | 40 | 3 | 20 | |
| composition | Styrene | 28.5 | 30 | 24 | 34 | 13 | 7.5 | 8 | | 14 | |
| | Methyl methacrylate | 5 | 13 | | | | 7.5 | | 1.5 | 10 | |
| | Acrylonitrile | | | | | 10 | | | | | |
| | Itaconic acid | | | | 1.5 | | 0.5 | 1 | | | |
| | Methacrylic acid | 1.5 | 2 | | | | | | 0.5 | | |
| | Acrylic acid | | | 1 | | 1 | | | | 1 | |
| | Acrylamide | | | | 1.5 | 1.5 | | 1 | | | |
| | Core/shell ratio | 40/60 | 30/70 | 55/45 | 55/45 | 50/50 | 50/50 | 50/50 | 95/5 | 55/45 | |

EXAMPLE 2

Coating compositions having a solids concentration of 40% were prepared in accordance with the recipes shown in Table 2 using the synthetic copolymer latices indicated in Table 1.

TABLE 2

| | Recipe No. | | | |
|---|---|---|---|---|
| Ingredients | A | B | C | D |
| Kaolinite clay (*1) | 100 | 80 | 80 | 80 |
| Dispersant (*2) | 0.2 | 0.16 | 0.16 | 0.16 |
| Polystyrene pigment (*3) | — | 20 | 20 | — |
| Ammonium casein (*4) | 8 | 8 | 8 | 8 |
| Commercial latex (*5) | 10 | — | 10 | — |
| Copolymer latex (see Table 1) | — | — | — | 20 |

Note
(*1) UW-90, a product of Engelhard Mineral & Chemicals
(*2) ARON T-40, a product of Toa Gosei Co., Ltd.
(*3) DOW PLASTIC PIGMENT 722, a product of Dow Chemical Co., Ltd.
(*4) Casein (containing 10% of casein containing 28% ammonia) produced in New Zealand
(*5) NIPOL LX407C (styrene/butadiene copolymer latex made by Nippon Zeon Co., Ltd.)

Each of the compositions was coated by a wire bar onto raw paper for medium quality coated paperboards (350 g/m²) so that the rate of coating was 15±0.5 g/m², and immediately then, dried with hot air at 150° C. for 20 seconds. The coated paper was subjected to a waterproofing treatment with 3% aqueous zinc sulfate, and supercalendered at 60° C. and a linear pressure of 100 kg/cm. The coated paper was tested as follows, and the results are shown in Table 3.

Blister packaging adaptability

A 1:1 mixture of a bonding agent for blister packaging (#1, made by Arakawa Paint Industry Co., Ltd.) and a diluent (4:1 (by weight) mixture of toluene and ethyl acetate) was coated to a uniform thickness by a coating rod on a sample of the coated paper, and dried with hot air at 100° C. for 10 seconds. Five pieces of a rigid vinyl chloride resin sheet for blister packaging having a fixed area were separately laid on the coated surface of the coated paper sample parallel to the sheet-forming direction, and additional five pieces, in a direction at right angles to the sheet-forming direction. The plastic pieces were then press-bonded to the coated paper at 150° C. for 5 seconds by a heat sealer to prepare ten test samples.

Separately, ten additional samples were prepared in the same way as above except that a piece of paper obtained by printing on the above coated paper was used instead of the coated paper.

The vinyl chloride resin piece was peeled off from each of the twenty samples, and by a 5-point scale, the adhesion strength between the coated surface and the vinyl chloride resin piece in each sample was evaluated. The total points of the twenty samples evaluated is defined as the blister packaging adaptability.

The printed surface of the above coated paper was formed by solid printing of a black offset ink by an RI tester to be described below.

Bondability

Life Bond AV-65 (a product of Nichiei Chemical Industry Co., Ltd.) and Movinyl #645 (a product of Hoechst Synthesis Co., Ltd.) were coated on the surface of the caoted paper by using spacers so that the bond-coated area had a width of 5 mm, a length of 50 mm and a thickness of 0.1 mm. The uncoated surface (the coated surface in the case of the raw paper for high quality coated paperboards in Example 3) of the coated paper was folded over the bond-coated surface, and the folded portion was press-bonded three times using a roller at a linear pressure of 100 g/cm. After removing the pressure, the bonded paper was left to stand for 24 hours at a constant temperature of 20° C. and a constant humidity of 65%. Then, the bonded portion was peeled apart, and the adhesion strength was evaluated by observing the state of fracture by a 5-point scale where 5 denotes complete fracture of the raw paper layer and 1 denotes peeling from the coated layer or the surface of the coated layer, and expressed as bondability.

Ink transferability

By using an RI tester (made by Akira Seisakusho), water was coated on the surface of the coated paper by a molten roll, and solid printing was carried out on the surface by using a black offset ink. After the printing, the paper was left to stand for one day at a constant temperature of 20° C. and a constant relative humidity of 60%. Thereafter, the density of the ink transferred was evaluated visually, and expressed by a 5-point scale wherein 5 represents excellent and 1, inferior.

K & N ink receptivity

K & N ink was coated on the coated paper and wiped off two minutes later, and the decrease in whiteness was measured.

Dry pick

By using the RI tester, overprinting was carried out on the coated paper six times using an offset ink. The degree of paper picking was evaluated visually and shown by a 5-point scale where 5 represents excellent and 1, inferior.

TABLE 3

| | Latex No. | | | | | | | | | | | | | | | |
|---|---|---|---|---|---|---|---|---|---|---|---|---|---|---|---|---|
| | Invention | | | | | | | | | | Comparison | | | | | |
| | 1 | 2 | 3 | 4 | 5 | 6 | 7 | 8 | 9 | 10 | a | b | c | d | e | f |
| | | | | | | | | Compounding No. | | | | | | | | |
| Test Item | D | D | D | D | D | D | D | D | D | D | D | D | D | D | D | D |
| Blister packaging adaptability (full marks 100) | 95 | 95 | 85 | 95 | 90 | 85 | 80 | 80 | 75 | 65 | 55 | 50 | 40 | 30 | 70 | 68 |
| Ink transferability (5-point rating) | 4 | 4 | 3.8 | 4 | 4 | 4.3 | 4 | 4.5 | 4.5 | 4.7 | 3.1 | 3 | 3 | 3 | 3.5 | 3.5 |
| K & N ink receptivity (%) | 27.3 | 26.1 | 20.0 | 26.8 | 27.1 | 30.5 | 24.2 | 33.1 | 28.6 | 35.6 | 17.5 | 14.5 | 11.5 | 15.0 | 21.5 | 20.9 |
| Dry pick (5-point rating) | 4.3 | 4.3 | 4.5 | 4.3 | 4.3 | 4 | 4 | 4 | 4 | 3.8 | 4.7 | 5 | 5 | 2 | 4.5 | 4.5 |
| Bondability (5-point rating) | 5 | 5 | 5 | 5 | 5 | 5 | 5 | 5 | 5 | 4.5 | 3.5 | 3.5 | 3.5 | 1 | 5 | 5 |

| | Latex No. Comparison | | | | | | |
|---|---|---|---|---|---|---|---|
| | g | h | i | j | — | — | — |
| | Compounding No. | | | | | | |
| Test Item | D | D | D | D | A | B | C |
| Blister packaging adaptability (full marks 100) | 40 | 60 | 60 | 40 | 30 | 0 | 50 |
| Ink transferability (5-point rating) | 3.5 | 5 | 3 | 3.8 | 3.7 | 5 | 3.9 |
| K & N ink receptivity (%) | 12.1 | 37.1 | 13.2 | 27.1 | 17.1 | 38.0 | 24.2 |
| Dry pick (5-point rating) | 5 | 2.5 | 3 | 2.8 | 4 | 1 | 3.5 |
| Bondability (5-point rating) | 3.5 | 3 | 3.5 | 3 | 3.5 | 1 | 4 |

EXAMPLE 3

Coating compositions having a solids concentration of 40% were prepared in accordance with the recipes shown in Table 4 by using latex No. 1 shown in Table 1, and coated on raw papers (300 g/m²) for high quality coated paperboards under the same conditions as in Example 1. The coated papers were tested in the same way as in Example 1, and the results are shown in Table 5.

TABLE 4

| | Compounding No. | | | | | | | |
|---|---|---|---|---|---|---|---|---|
| Compounding agents | A | E | F | G | H | I | J | K |
| Kaolinite clay (*1) | 100 | 100 | 100 | 80 | 80 | 95 | 90 | 80 |
| Dispersing agent (*2) | 0.2 | 0.2 | 0.2 | 0.16 | 0.16 | 0.19 | 0.18 | 0.16 |
| Polystyrene pigment (*3) | — | — | — | 20 | 20 | — | — | — |
| Synthetic copolymer latex (latex No. 1 in Table 1) | — | — | — | — | — | 5 | 10 | 20 |
| Ammonium casein (*4) | 8 | — | — | — | — | — | — | — |
| Denatured starch (*6) | — | 5 | 5 | 5 | 5 | 5 | 5 | 5 |
| Commercial latex (*5) | 10 | 13 | 16 | — | 13 | 10.5 | 8 | 3 |

(*1) to (*5) were the same as the footnote to Table 2.
(*6) MS-4600, a product of Nippon Shokuhin Kako K. K.

TABLE 5

| | Compounding No. | | | | | | | |
|---|---|---|---|---|---|---|---|---|
| | Invention | | | Comparison | | | | |
| Test Item | I | J | K | A | E | F | G | H |
| Blister packaging adaptability (full marks 100) | 75 | 83 | 96 | 40 | 0 | 30 | 0 | 40 |
| Ink transferability (5-point rating) | 3.9 | 4.2 | 4.5 | 4 | 3.5 | 2 | 5 | 4 |
| K & N ink receptivity (%) | 12.9 | 15.6 | 18.9 | 14.1 | 11.2 | 6.0 | 22.5 | 15.0 |
| Dry pick (5-point rating) | 5 | 5 | 5 | 4 | 4 | 5 | 1 | 3.8 |

TABLE 5-continued

| | Compounding No. | | | | | | | |
|---|---|---|---|---|---|---|---|---|
| | Invention | | | Comparison | | | | |
| Test Item | I | J | K | A | E | F | G | H |
| Bondability (5-point rating) | 4.5 | 4.5 | 4.5 | 4 | 3.5 | 5 | 1 | 3.5 |

What is claimed is:

1. A copolymer latex for paper coating comprising heterogeneous polymer particles having a hard polymer domain and a soft polymer domain, characterized in that
    (a) the hard polymer domain is a polymer having a glass transition temperature of at least 60° C.,
    (b) the soft polymer domain is a copolymer obtained by polymerizing in the presence of a latex of the hard polymer a monomeric composition composed of
        (i) 20 to 70% by weight of an aliphatic conjugated diene monomer,
        (ii) 20 to 60% by weight of a monovinylidene aromatic monomer,
        (iii) 0.5 to 10% by weight of an ethylenically unsaturated acid,
        (iv) 0 to 10% by weight of an ethylenically unsaturated amide, and
        (v) 0 to 30% by weight of a monomer copolymerizable with said monomers,
    (c) the proportion of the hard polymer domain is 55 to 90% by weight of the entire polymer particles, and
    (d) the proportion of the soft polymer domain is 45 to 10% by weight of the entire polymer particles.

2. The polymer latex of claim 1 wherein the heterogeneous polymer particles are composed of 55 to 80% by weight of the hard polymer domain and 55 to 70% by weight of the soft polymer domain.

3. The polymer latex of claim 1 wherein the soft polymer domain is a copolymer obtained by polymerizing a monomeric composition composed of (i) 25 to 65% by weight of the aliphatic conjugated diene monomer, (ii) 25 to 50% by weight of the monovinylidene aromatic monomer, (iii) 0.8 to 8% by weight of the ethylenically unsaturated acid, (iv) 2 to 7% by weight of the ethylenically unsaturated amide, and (v) 0 to 30% by weight of the monomer copolymerizable with said monomers.

4. A paper coating composition comprising the polymer latex of claim 1 and a pigment.

5. The paper coating composition of claim 4 wherein the amount of the polymer latex is 3 to 40% by weight as solids based on the total amount, as solids, of the polymer latex, pigment and binder.

6. The paper coating composition of claim 4 further comprising a binder.

7. The polymer latex of claim 1 wherein the heterogeneous polymer particles are core-shell polymer particles, wherein the core is comprised of the hard polymer domain and the shell is comprised of the soft polymer domain.

8. The polymer latex of claim 1 wherein monomer (b)(i) is 1,3-butadiene, 2-methyl-1,3-butadiene, 2,3-dimethyl-1,3-butadiene, or halogen-substituted butadiene; monomer (b)(ii) is styrene, alpha-methyl styrene, 4-methyl styrene, monochloro styrene or hydroxymethyl styrene; monomer (b)(iii) is acrylic acid, methacrylic acid, crotonic acid, cinnamic acid, itaconic acid, fumaric acid, maleic acid, maleic anhydride, monoethyl itaconate, monobutyl fumarate, monoethyl maleate, butyl hydroxypropyl maleate, 2-sulfoethyl acrylate, 2-sulfopropyl methacrylate, acrylamidopropanesulfonic acid, or styrenesulfonic acid; monomer (b)(iv) is acrylamide, methyacrylamide, N-methylolacrylamide or N-butoxymethylacrylamide; and monomer (b)(v) is methyl acrylate, ehtyl acrylate, methyl methacrylate, butyl acrylate, acrylonitrile, methacrylonitrile, beta-hydroxyethyl acrylate, glycidyl acrylate, glycidyl methacrylate, acrolein, allyl alcohol, divinylbenzene, diallyl phthalate diallyl maleate, triallyl cyanurate, ethylene glycol dimethacrylate, allyl acrylate of p-isopropenylstyrene.

9. The polymer latex of claim 1 wherein said polymer particles have an average particle diameter of 0.1 to 0.5 micron.

10. A coated paper adaptable to blister packaging and printing comprising a paper board substrate and a film of a paper coating composition coated thereon, said paper coating composition comprising heterogeneous polymer particles having a non-film forming hard polymer domain and a film-forming soft polymer domain, said polymer particles comprising from 55 to 90% by weight of the entire polymer particles of said hard particle domain comprised of a polymer having a glass transition temperature of at least 60° C., and from 45 to 10% by weight of the entire polymer particles of the soft polymer domain comprising a copolymer obtained by polymerizing a monomeric mixture in the presence of a latex of the hard polymer, said monomeric composition comprising
    (i) 20 to 70% by weight of an aliphatic conjugated diene monomer,
    (ii) 20 to 60% by weight of a monovinylidene aromatic monomer,
    (iii) 0.5 to 10% by weight of an ethylenically unsaturated acid,
    (iv) 0 to 10% by weight of an ethylenically unsaturated amide, and
    (v) 0 to 30% by weight of another monomer copolymerizable with said monomers (i)–(iv).

* * * * *

UNITED STATES PATENT AND TRADEMARK OFFICE
CERTIFICATE OF CORRECTION

PATENT NO. : 4,613,633

DATED : September 23, 1986

INVENTOR(S) : MASAYOSHI SEKIYA, ET AL.

It is certified that error appears in the above—identified patent and that said Letters Patent is hereby corrected as shown below:

IN THE CLAIMS

Claim 8, line 15 (column 12, line 24),
   delete "ehtyl",
   insert --ethyl--.

Signed and Sealed this

Ninth Day of December, 1986

Attest:

DONALD J. QUIGG

*Attesting Officer*     *Commissioner of Patents and Trademarks*